United States Patent [19]

Urai

[11] 4,403,356
[45] Sep. 13, 1983

[54] SEAT CUSHIONS

[75] Inventor: Muneharu Urai, Tokyo, Japan

[73] Assignee: Tachikawa Spring Co., Ltd., Japan

[21] Appl. No.: 202,346

[22] Filed: Oct. 30, 1980

[30] Foreign Application Priority Data

Nov. 13, 1979 [JP] Japan .................................. 54-146034

[51] Int. Cl.³ ...................... A47C 27/16; A47C 27/14
[52] U.S. Cl. ...................................... 5/481; 297/458;
297/DIG. 1
[58] Field of Search ............................ 5/481, 448, 482;
297/458, DIG. 1, 229

[56] References Cited

U.S. PATENT DOCUMENTS

| | | | |
|---|---|---|---|
| 3,098,716 | 6/1963 | Friedman | 297/458 |
| 3,161,436 | 12/1964 | Hood | 297/DIG. 1 |
| 3,713,697 | 1/1973 | Koepke | 297/458 |
| 3,878,277 | 4/1975 | Velte | 5/481 |
| 3,974,532 | 8/1976 | Ecchuya | 5/481 |
| 4,064,578 | 12/1977 | Yamada | 5/481 |

FOREIGN PATENT DOCUMENTS 2523527 12/1975 Fed. Rep. of Germany .......... 5/481

Primary Examiner—Alexander Grosz
Attorney, Agent, or Firm—Oldham, Oldham, Hudak, Weber & Sand

[57] ABSTRACT

A seat cushion for use in a seat of, for example, an automobile is manufactured by preparing a seat surface covering including a seating portion of fabric material and side portions of suitable material joined by sewing or high-frequency welding to the seating portion, and bonding a skinless molded block of cushion providing material or a profile-cut slab of cushion providing material to the seating portion of the seat surface covering by a bonding agent distributed at scattered points.

9 Claims, 12 Drawing Figures

SEAT CUSHIONS

BACKGROUND OF THE INVENTION

This invention relates to seat cushions for use in seats of automobiles and various types of furniture, and more particularly to a seat cushion which is covered at its surface with a seat surface covering of fabric or like material of bag-like structure and which is packed thereinside with a mass of foamed synthetic resin material such as foamed polyurethane bonded to the seat surface covering.

A covering material such as a fabric material with or without a vinyl coating is most commonly used in many of prior art seat cushions for seats in automobiles. One of typical prior art processes employed for the manufacture of a seat cushion of this kind comprised the steps of cutting a web of fabric material with or without a vinyl coating into pieces correspondind to the portions including the seating portion and side portions, sewing together these pieces of fabric material to form a seat surface covering of bag-like structure, inserting a filler pad of cushion providing material such as foamed polyurethane into the internal space of the seat surface covering of bag-like structure, and mounting the resultant assembly on a seat frame provided with springs.

However, such a prior art manufacturing process required an extended time and a lot of labor. In addition, the prior art process was defective in that twists and creases impairing the beautiful appearance of the products occurred frequently, and some of the products were extremely distorted to such an extent that the remedy thereof required also an additional extended time and much labor together with an additional cost.

In an effort to obviate these prior art defects, there has been recently proposed a seat cushion manufactured by applying a back coating of vinyl or like material to a seat-covering providing fabric material, heating the fabric material, shaping the fabric material into the form of a seat surface covering of bag-like structure by use of shaping dies or any other suitable means, and in lieu of inserting a filler pad of cushion providing material into the seat surface covering of bag-like structure, injecting a solution of polyurethane into the internal space of, the seat surface covering of bag-like structure to integrally mold foamed polyurethane with the seat surface covering being retained between the dies. Such an integral molding process obviates the aforementioned prior art defects, and distinct embossed pattern can be produced on the product.

However, such a method finds a limited application and is only applicable to vinyl-coated fabric materials or fabric materials having a back coating of vinyl chloride or like material. Further, in the product obtained by the integral molding of foamed polyurethane with the seat surface covering of fabric material, the polyurethane solution tends to penetrate through the texture thereby hardening the seat surface covering or producing blurs on the surface thereof, or the solution may solidify to impair the otherwise beautiful appearance of the product. Thus, the seat cushion obtained by the proposed method has been defective in that its seat surface covering has no permeability to air, the otherwise beautiful external appearance is impaired, and the seat cushion does not provide the desired comfortableness to sit thereupon.

A pair art seat cushion obtained by bonding a filler pad of foamed polyurethane to a seat surface covering of fabric material of bag-like structure has also been defective in that a thin layer tending to be formed on the surface of the filler pad of foamed polyurethane by, for example, the mold releasing agent used in the molding step deteriorates the permeability to air and acts as a source of unusual noise, and also, separation of the bonded portions together with stripping of the thin surface layer tends to occur.

Further, in the seat cushion manufactured by the prior art process of integral vacuum molding of a foamed synthetic resin material such as foamed polyurethane with a vinyl-coated or vinyl-backed fabric material which provides the seat surface covering, a fault during the formation of the seat surface covering or during the molding of the foamed polyurethane gives rise to necessarily a counter-fault in the other. For examplem a large void produced within the molded layer of foamed polyurethane or similar void produced at the interface between the seat surface covering and the molded layer of foamed polyurethane is very difficult to remedy, and this difficulty has been the greatest problem encountered with the seat cushions manufactured by the integral vacuum molding process.

The material cost of the seat surface covering of the seat custion has become considerably high when a single piece of highly extensible fabric material is used to continuously cover the seat cushion portions including the seating portion and side portions to meet a specification requirement. Further, when the seat custion includes undercuts in its side portions, shaping dies of inversely tapered configuration have been required resulting in difficulty of shaping the seat surface covering into the desired form.

BRIEF SUMMARY OF THE INVENTION

It is therefore a primary object of the present invention to obviate all of the defects of the prior art seat cushions having the structure above described. The present invention contemplates provision of a seat cushion which is free from any degradation in quality and any asymmetry in external shape and which can be manufactured at low cost without any losses of the peculiar properties of texture such as the feeling of soft touch, permeability to air and deluxe appearance in spite of the fact that its surface covering is formed of a fabric material.

In accordance with the present invention, there is provided a seat cushion comprising a seat surface covering including a seating portion of fabric material shaped to conform to a required surface configuration and seat side portions joined thereto, and a skinless molded block of cushion providing material or a profile-cut slab of cushion providing material bonded by a bonding agent to the seating portion of the seat surface covering at a plurality of distributed points.

BRIEF DESCRIPTION OF DRAWINGS

Preferred embodiments of the present invention will now be described in detail with reference to the accompanying drawings, in which.

DETAILED DESCRIPTION

Figure 1:
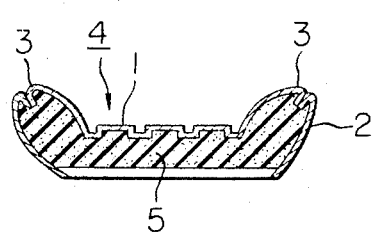
FIG. 1 is a schematic sectional view of an embodiment of the seat cushion of the present invention obtained by bonding a mass of cushion providing material to a seat surface covering.

Referring to FIG. 1, an embodiment of the seat cushion according to the present invention comprises a seat surface covering of bag-like structure designated generally by the numeral 4. The seat surface covering 4 includes a seating portion 1 of woven or non-woven fabric material, side portions 2 of suitable material, and a joint 3 between the seating portion 1 and the side portions 2 with or without melt-providing intermediate elements being interposed therebetween. There may also be rear side portions and a head rest portion of a front back although not shown in FIG. 1 which illustrates a seat cushion for use in a seat of an automobile, by way of example. The numeral 5 designates a mass of cushion providing material, for example, a skinless molded block or a profile-cut slab of foamed synthetic resin material such as foamed polyurethane. The seating portion 1 of the seat surface covering 4 retains the permeability and the feeling of soft touch peculiar to texture since it is not provided with a coating such as a back coating of vinyl or like material.

Figure 2:
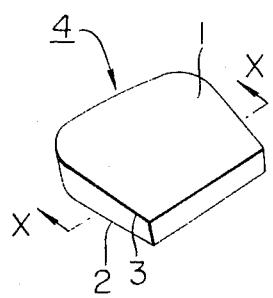
FIG. 2 is a schematic perspective external view of the seat surface covering of bag-like structure before being shaped into the form shown in FIG. 1.

FIG. 2 shows in perspective view only the seat surface covering 4 of bag-like structure before being shaped into the form shown in FIG. 1. Since the seating portion 1 of the seat surface covering 4 is shaped into the form shown in FIG. 1 by stretching the fabric, the associated side portions 2 are cut to be relatively wider to deal with the elongation of the seating portion 1 itself. However, they may not be so cut depending upon the specification requirement. The shape of the side portions 2 will not appreciably change before and after the step of shaping with dies. It is the seat surface covering 4 that is provided by bonding the side portions 2 to the seating portion 1 at the joint 3 by means such as sewing with a sewing machine or welding with a high-frequency welder, with or without welt-providing intermediate elements (not shown) being interposed therebetween.

Figure 3:
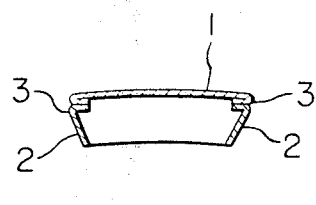
FIG. 3 is a schematic sectional view taken along the line X-X in FIG. 2.

FIG. 3 is a schematic sectional view taken along the line X—X in FIG. 2. It will be seen in FIG. 3 that the side portions 2 taper toward each other from the seating portion 1 in an overhanging fashion.

As described with reference to FIG. 1, the mass 5 of cushion providing material is a skinless molded block or a profile-cut slab of foamed synthetic resin material such as foamed polyurethane and is bonded at spaced points by a bonding agent to the seating portion 1 of the seat surface covering 4 without being stripped off the seating portion 1 as described later. The skinless mass 5 of cushion providing material ensures the permeability required for this type of seat cushions.

The seating portion 1 of the seat surface covering 4 shown in FIG. 1 is shaped by heating the seat surface covering 4 of bag-like structure and then applying a shaping or embossing pressure with a pair of an upper die and a lower die. Thus, a three-dimensional product can be obtained which is stable in its configuration, which reproduces sharp pattern in its embossed portion, which permits freedom of design and which is not obtainable with a sole process of sewing with a sewing machine or welding with a high-frequency welder.

The bonding agent can be applied in a required amount to necessary portions only of the back surface of the seating portion 1 of the seat surface covering 4 or the front surface of the mass 5 of foamed polyuretane to be bonded thereto. Such a manner of bonding eliminates completely the possibility of occurrence of creases in the seating portion 1 due to the elongation of the seating portion 1 itself. The bonding agent should not be applied to such an area of the seating portion 1 at which concentrated deformation will appear when an occupant sits on the seat and the resultant bending of the surface of the mass 5 of foamed polyurethane will produce bends and creases in the seating portion 1.

The bonding agent should not be applied with a brush to the overall surface of the seating portion 1 or the mass 5 but should be applied with a sprayer or using a perforated plate as a mask so that the bonding agent can be applied or distributed in a scattered dot pattern. The bonding of the mass 5 of foamed polyurethane to the seating portion 1 of the seat surface covering 4 at such distributed or scattered points ensures the desired permeability. The pattern of distribution of the bonding agent is in no way limited to the scattered dot pattern above-described, and the bonding agent may be distributed in any of customary distribution patterns including a stripe pattern and a lattice pattern. The requirement is to ensure a firm bond between the seating portion 1 of fabric material and the mass 5 of cushion providing material without the loss of desired permeability. In the present invention, a previously prepared mass 5 of foamed polyurethane is bonded at distributed points to the seating portion 1 of fabric material. Therefore, the chance of producing rejects is less than that of the prior art products manufactured by the process of integral vacuum molding, and the foamed polyurethane may be used in its hot-cured state or its cold state as desired.

Figure 4:
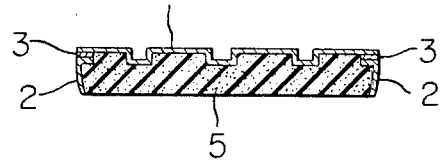
FIG. 4 is a schematic sectional view of another embodiment of the present invention obtained by bonding a profile-cut slab of cushion providing material to a seat surface covering.

In a form shown in FIG. 4, a profile-cut slab of foamed polyurethane is used as the mass 5 of cushion providing material. The seat cushion shown in FIG. 4 is satisfactorily permeable to air and retains the desired configuration due to the good bond between the elements 1 and 5. This seat cushion is suitable for use in a rear seat of an automobile.

Figure 5:
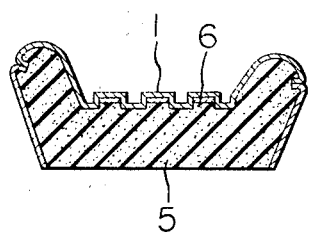
FIG. 5 is a view similar to FIG. 1 but showing filler pad strips bonded to a skinless molded block of cushion providing material.

In a form shown in FIG. 5, a plurality of filler pad strips 6 are bonded to necessary portions (portions curresponding to the projections of the seating portion 1 in this case) of the mass 5 of cushion providing material, so that the surface of the seating portion 1 can provide the feeling of soft touch.

Figure 6:
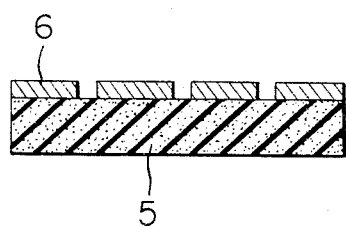
FIG. 6 is a view similar to FIG. 4 but showing filler pad strips bonded to a profile-cut slab of cushion providing material.

In a form shown in FIG. 6, the projections on the surface of the profile-cut slab 5 of foamed polyurethane are not provided, and instead, a plurality of spaced filler pad strips 6 are bonded to the upper surface of the slab 5 so as to provide the feeling of soft touch.

Figure 7:
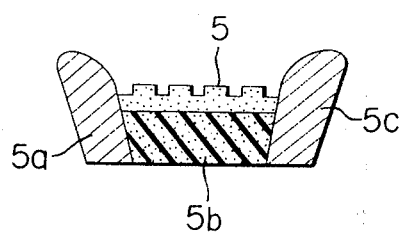
FIG. 7 is a schematic sectional view of another form of the mass of cushion providing material provided by bonding together a plurality of molded blocks having different hardnesses.

FIG. 7 shows that the mass 5 of cushion providing material is composed of a plurality of molded blocks 5, 5a, 5b and 5c of foamed polyurethane having different hardnesses and shapes, and these blocks are bonded together to conform to the desired overall configuration. In FIG. 7, the seat surface covering 4 is not illustrated. Such a structure may also be provided by foaming polyurethane solutions having different specific gravities or by profile-cutting of a slab of foamed polyurethane to conform to the requred configuration or by inserting foamed polyurethane chips in a molded block of foamed polyurethane.

Figure 8:
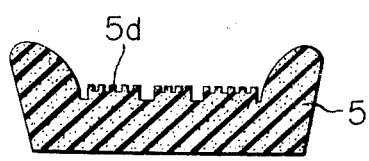
FIG. 8 is a schematic sectional view of still another form of the mass of cushion providing material formed at its upper surface with serrated or channeled portions.

In a form shown in FIG. 8, a plurality of serrated or channeled portions 5d are formed on the upper surface of the mass 5 of cushion providing material to provide a feeling of softer touch. This structure exhibits the same meritorious effect as that of the structure including the filler pad strips bonded to the mass 5 of cushion providing material.

Figure 9:
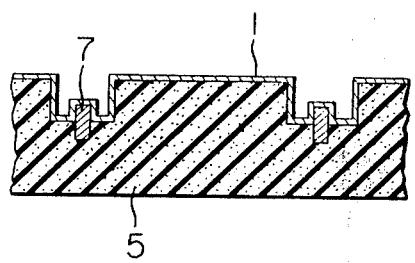
FIG. 9 is an enlarged schematic sectional view of part of still another form of the molded block of cushion providing material having chips of harder material inserted therein.

FIG. 9 shows, in enlarged schematic sectional view, part of the seat cushion shown in FIG. 1 when the seating portion 1 includes a small projection at the bottom of each of the channels formed by embossing. In order to sharply define these projections, chips 7 of harder foamed polyurethane are inserted in the molded block 5 of foamed polyurethane prior to or during the molding of the block 5.

In each of the aforementioned embodiments, a thermal-shaping stabilizing agent may be applied to the sharp corners of the embossed portion of the seating portion 1 of the seat surface covering 4 so as to stably retain the sharpness of the corners.

Figure 10:
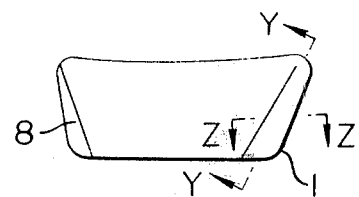
FIG. 10 is a schematic side elevation view of still another embodiment of the seat cushion according to the present invention.

In the seat cushion described hereinbefore, the seating portion 1 and the side portions 2 are bonded together to form the seat surface covering 4 of bag-like structure with the side portions 2 overhanging. It is apparent, however, that a product without such an overhang can be similarly manufactured although not illustreted. Further, depending upon a specification requirement, the seating portion 1 may be extended to provide the side portions 2 so that a single piece of fabric material can provide the seat surface covering 4 including the overhanging side portions 2. Such an embodiment is shown in FIG. 10 which is a schematic side elevation view, FIG. 11 which is a schematic section view taken along the line Y—Y in FIG. 10, and FIG. 12 which is a schematic sectional view taken along the line Z—Z in FIG. 10. As best shown in FIG. 12, the seat cushion includes folded portions 8 formed by folding the fabric of the seating portion 1 in the zones of the side portions 2. Further, depending upon the design, a plurality of decorative creases may be formed in the overhanging side portions 2. A seat cushion not having such overhanging portions may be provided by shaping a single extensible piece of fabric material into a form not including the folded portions 8 above described.

Such a seat cushion possesses also the features of the aforementioned embodiments.

It is apparent that the material of the seating portion 1 of the seat surface covering 4 is in no may limited to the woven or non-woven fabric material referred to above.

In the aforementioned embodiments, the seating portion 1 is shaped with dies after being heated. However, depending upon a specification requirement, a piece of fabric material having been heated but not shaped yet may be stretched and bonded to the side portions to provide the seat cushion of the present invention, provided that the fabric material possesses an extensibility enough to satisfy the desired configuration of the seating portion 1.

Figure 11:
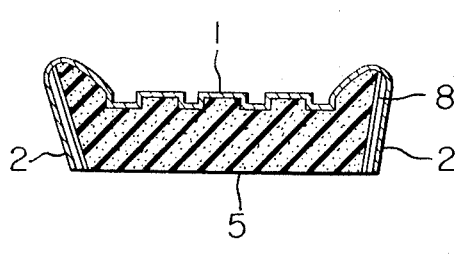
FIG. 11 is a schematic sectional view taken along the line Y—Y in FIG. 10.
Figure 12:
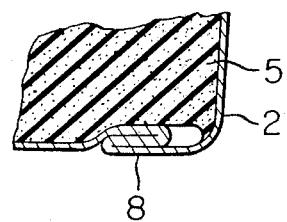
FIG. 12 is a schematic sectional view taken along the line Z—Z in FIG. 10.

In the case of the seat cushion shown in FIGS. 10, 11 and 12 too, the seating portion 1 of the seat surface covering may similarly be shaped into the desired form without application of heat, when the specification requires so. However, when there is a demand for more accurate sharpness of the corners of the embossed portions, heat may be applied to attain the desired purpose.

The present invention described in detail hereinbefore is in no way limited to the seat cushions of various sectional shapes shown in the drawings and is equally effectively applicable to various other shapes and designs. Further, although the drawings illustrating the embodiments shown an application of the present invention to a front seat, the present invention is in no way limited to such a specific application and is equally effectively applicable to, for example, front backs, rear seats, internal equipment of vehicles and various types of furniture.

It will be understood from the foregoing description that the seat cushion according to the present invention is manufactured by bonding a mass of cushion providing material to a seating portion of a seat surface covering with a bonding agent distributed at scattered points. Therefore, the seat cushion is satisfactorily permeable to air and provides a comfortable feeling to set thereupon as it does not include a vinyl or like coating and is sufficiently cushionable. When the same design as that provided by sewing with a sewing machine is demanded, the overhanging side portions may be so designed. The tendency of producing rejects is less than that of prior art products manufactured by the process of integral vacuum molding of a mass of foamed polyurethane and a seat surface covering.

In the seat cushion according to the present invention, there is little possibility of producing creases tending to give rise to breaks imparing the otherwise beautiful appearance of the seat surface covering. Further, the material cost of the seat surface covering can be reduced although it depends upon the specification requirement and the design. Furthermore, a fabric material which is not so extensible can also be used to form the seating portion of the seat surface covering, and the manufacturing costs of the seat cushion can be reduced due to the saving of labors required for sewing and assembling.

What is claimed is:

1. A seat cushion comprising a seat surface covering including a seating portion of fabric material shaped to conform to a required surface configuration and seat side portions joined to said seating portion, and a mass of cushion providing material bonded by a bonding agent to said seating portion of said seat surface covering at a plurality of distributed points.

2. A seat cushion as claimed in claim 1, wherein a plurality of filler pad strips are bonded to areas of the surface of said mass of cushion providing material.

3. A seat cushion as claimed in claim 1, wherein said seating portion and said side portions are joined together by sewing with a sewing machine or welding with a high-frequency welder.

4. A seat cushion as claimed in claim 1, wherein said seating portion is extended to provide said side portions so that said seat surface covering can be made of a single piece of fabric material.

5. A seat cushion as claimed in claim 1, wherein said bonding agent is distributed in a scattered dot pattern.

6. A seat cushion as claimed in claim 1, wherein a plurality of slab chips are bonded to spaced areas of the surface of said mass of cushion providing material.

7. A seat cushion as claimed in claim 1, wherein said seat cushion has a seating portion with an area where concentrated deformation will appear underload, and said bonding agent is not present at said area of said seating portion.

8. A seat cushion comprising:
a seat surface covering including a seat portion of fabric material which has an embossed three-dimensional surface form and side portions connected with said seat portion, and
a mass of cushion providing material which has a complementary shape to said three-dimensional surface form of said seat portion and an easy bonding surface;
said cushion providing material being bonded to the seat portion of said seat surface covering at distributed points.

9. A seat cushion as in claim 8, wherein
said side portions initially are separate from said seat portion, and said cushion providing material is bonded to said seat portion of fabric material at distributed points over its full surface area.

* * * * *